United States Patent [19]

Fujiwara

[11] Patent Number: 5,657,405
[45] Date of Patent: Aug. 12, 1997

[54] OPTICAL FIBER SENSOR FOR MEASURING PRESSURE OR DISPLACEMENT

[75] Inventor: Kazuhiro Fujiwara, Tokyo, Japan

[73] Assignee: Research Institute of Advanced Material Gas-Generator, Tokyo, Japan

[21] Appl. No.: 608,636

[22] Filed: Feb. 29, 1996

[30] Foreign Application Priority Data

Apr. 17, 1995 [JP] Japan ................................. 7-091130
Jul. 18, 1995 [JP] Japan ................................. 7-181765

[51] Int. Cl.$^6$ ........................................................ G02B 6/26
[52] U.S. Cl. ............................... 385/12; 356/225; 356/371
[58] Field of Search .............................. 385/12, 15, 31, 385/33; 356/225, 218, 371, 32; 250/227.14

[56] References Cited

U.S. PATENT DOCUMENTS

| 4,832,491 | 5/1989 | Sharpe et al. | 356/326 |
| 5,477,323 | 12/1995 | Andrews et al. | 356/345 |
| 5,488,476 | 1/1996 | Mansfield et al. | 356/371 |
| 5,548,404 | 8/1996 | Kupershmidt et al. | 356/368 |

FOREIGN PATENT DOCUMENTS

| 0048748 | 3/1986 | Japan | 250/227.14 |
| 2202936 | 10/1988 | United Kingdom | 250/227.14 |
| 9305359 | 3/1993 | WIPO | 250/227.14 |

OTHER PUBLICATIONS

J. W. Berthold and S. E. Reed, "Flight Test Results From FOCSI Fiber Optic Total Pressure Transducer", SPIE vol. 2295 Fly-by-Light (1994), pp. 216–222. no month.

Thomas L. Weaver, Daniel W. Seal, "The Fiber Optic Control System Integration Program: for optical flight control system development", SPIE vol. 2295 Fly-by-Light (1994), pp. 10–13, 17, 18, 26, 27. no month.

W. L. Glomb, Jr., "Electro–Optic Architecture (EOA) For Sensors and Actuators In Aircraft Propulsion Systems", Final Technical Report (United Technologies Research Center). NASA–CR–182270 Appendix B, pp. 2–3, 3–2, 3–3, 3–4. Jun. 1989.

*Primary Examiner*—John D. Lee
*Assistant Examiner*—Ellen E. Kang
*Attorney, Agent, or Firm*—Pearne, Gordon, McCoy & Granger LLP

[57] ABSTRACT

The object of the invention is to offer an optical fiber sensor for measuring pressure or displacement having a simple, compact and light-weight structure, which is capable of performing high-precision range, displacement and pressure measurements over a wide range of temperatures. The optical fiber sensor has a drive control circuit 2 which controls a laser diode 1 to emit a laser beam, which is then split by an optical fiber coupler 4. An optical fiber coupler 7 directs one portion of the split laser beam to an optical fiber 10, and the other portion to an optical fiber 16. A portion of the laser beam propagating through the optical fiber 10 is reflected at the end surface 10a of the optical fiber 10 as a reference beam, while the rest of the laser beam is reflected at a peripheral portion of a diaphragm 12 to be incident upon the end surface 10a as a reflected beam. The two beams form an interference beam which is then split by the optical fiber coupler 7. In the same manner as with the optical fiber coupler 7, an optical fiber coupler 8 splits an interference beam propagating through the optical fiber 16. The interference beams are converted to electrical signals by a photoelectric converter 22, from which distances $L_1$ and $L_2$ are determined and the measurement pressure P is calculated by means of a calculation processing circuit 23.

16 Claims, 8 Drawing Sheets

FIG.6A
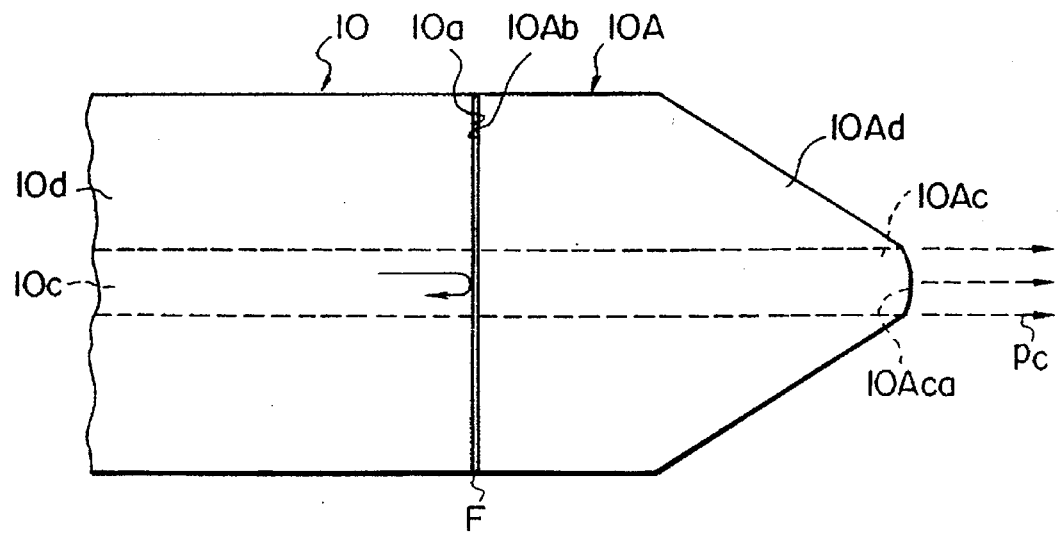
FIG.6B
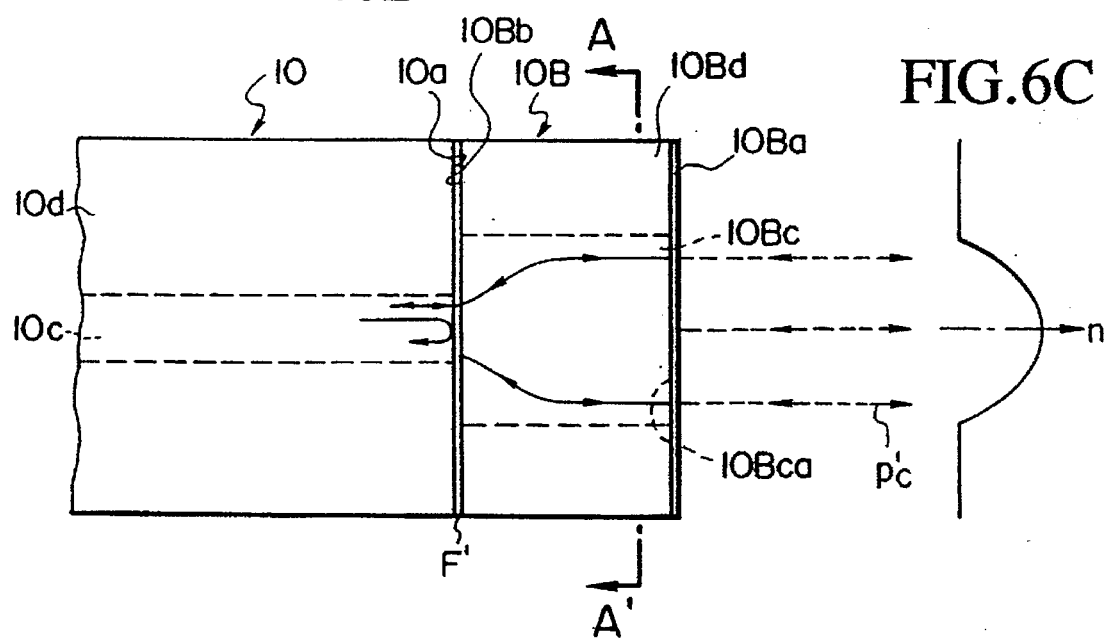
FIG.6C

OPTICAL FIBER SENSOR FOR MEASURING PRESSURE OR DISPLACEMENT

BACKGROUND OF THE INVENTION

1. Technical Field of the Invention

The present invention relates to optical sensors used in distance measurements, especially those which detect pressure by optically measuring the amount of deformation of a diaphragm.

2. Background Art

Conventionally, many types of sensors (measuring devices) which measure pressure, displacement, distance, or the like are known.

While conventional electrical pressure sensors may be found in a variety of forms, strain gauges for example, these electrical formats have the following disadvantages: (1) Being of electrical form, they require electrical wiring to transmit signals. As a result, they are often affected by electromagnetic interference which can lead to measurement errors. If parts are added to prevent such interference, then these can add to the weight or complicate the circuit structure. (2) They also require at least two signal wires to send and receive electrical signals. Moreover, electrical wiring is much heavier per unit length in comparison to optical fiber, so that the weight of the signal transmission route is greater.

Additionally, many types of optical displacement measurement sensors using interferometers or the like are known. As optical range finders, those which use triangulation methods are widely known.

Conventionally, optical fiber pressure sensors have been developed in order to resolve the problems of the electrical pressure sensors mentioned above. One such example is microbent pressure sensors, which have the following disadvantages: (1) They require a pair of sawtoothed microbending portions (known as microbenders or transducers) in order to microbend the optical fiber, resulting in problems in that (a) the overall size and weight of the sensor are increased; (b) there is a problem in durability due to biting and wear between the microbenders and the optical fiber, so that there is a significant risk of increases in measurement errors; (c) environmental temperature changes can cause the microbender portion to thermally expand, changing the microbending force on the optical fiber and resulting in temperature errors for which compensation is not easy; (d) due to problems such as those mentioned in (b) and (c) above, a high-precision pressure measurement is not possible, with the precision being in the range of ±1%. (2) While there is a method wherein optical intensity ratios are measured by using a delay line in order to reduce the influence of fluctuations in the optical intensity of the light source and the transmission route, the overall size and weight of the sensor are increased due to the addition of a delay line to the transducer.

The interferometer-type displacement measurement sensors mentioned above have the following disadvantages: (1) While they are highly precise, they are normally only able to measure up to a range of $\lambda/2$ (wherein $\lambda$ is the optical wavelength, for example when $\lambda=850$ nm, $\lambda/2=425$ nm), so that a complicated calculation is required when measuring displacements of more than $\lambda/2$. (2) Even if the measurement of displacements larger than $\lambda/2$ as explained in (1) is made possible, extremely high-level and complicated calculations are necessary to measure distances, making them quite costly. Therefore, they are not for general industrial use. (3) Since the device described in (1) is basically a displacement gauge, the amount of displacement of the measured object is not known while the power source to the calculation system is turned off, and only the relative displacement after reactivating the power source is able to be known. Additionally, the devices of (2) also often have configurations which result in the same effect when the power source is turned off.

The above-mentioned conventional optical distance finders using triangulation methods have the following disadvantages: (1) They are not very precise (while differing depending on the range format, usually on the order of $\pm 10^{-1}$ mm). (2) They are bulky and heavy due to their complicated optical systems.

SUMMARY OF THE INVENTION

Under consideration of the above points, the present invention has as its object the offering of an optical fiber sensor for measuring pressure or displacement, having a simple, compact and lightweight structure, which is capable of making high-precision distance measurements over a variety of temperatures and able to measure displacement and pressure as well.

An optical fiber sensor according to the present invention comprises a target for reflecting laser beams, having a first portion which is displaced by a measured pressure and a second portion which is not displaced by the measured pressure; a laser beam generation means for generating a laser beam; an optical coupler for dividing said laser beam; a first optical fiber for directing a laser beam to the first portion of said target; a second optical fiber for directing a laser beam to the second portion of said target; a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said target to be incident upon the end surface of said first optical fiber; a first measurement circuit for detecting, from said interference beam divided by said first optical coupler, an interference condition between said first reflected laser beam and said second reflected laser beam, in order to measure a distance between the end surface of said first optical fiber and said first portion of said target; a second optical coupler for directing another laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said target to be incident upon the end surface of said second optical fiber; a second measurement circuit for detecting, from said interference beam divided by said second optical coupler, an interference condition between said first reflected laser beam and said second reflected laser beam, in order to measure a distance between the end surface of said second optical fiber and said second portion of said target; and a processing circuit for determining a difference between measurement results of said first measurement circuit and said second measurement circuit.

Since the present invention is formed from a fiber optic system, it is not as easily influenced by electromagnetic interference in comparison to electronic pressure sensors, and the weight of the transmission routes can be largely reduced. Additionally, phase fluctuations due to external disturbances such as temperature fluctuations can be cancelled because the first reflected beams from the end portions of the first and second optical fibers and the second reflected beams from the first and second portions of the target travel along the same first and second optical fibers. Furthermore, the influence of external disturbances is reduced because the influence of expansion and contraction of the optical fiber lengths due to temperature changes is eliminated. The amount of deformation of the target can be determined without being affected by thermal expansion, even if the target thermally expands due to environmental temperature changes. Therefore, high-precision measurements are possible. In addition, the first and second optical fibers have approximately the same length and are provided in approximately identical environments. Since the difference in measurement results between the first and second measurement circuits is determined by the calculation circuits under these conditions, noise-cancellation components are generated. As a result, the S/N ratio is improved. Furthermore, the laser beams propagating through the first and second optical fibers are generated by identical laser beam generating means, so that the influences of errors or fluctuations in the central frequency, frequency deviation width and sweep frequency of the laser beam on the measurement values are identical for the measurement systems of both the first and second optical fibers. Consequently, measurement errors are able to be reduced in comparison to the case wherein the laser beams respectively propagating through the first and second fibers are generated by separate laser beam generating means.

BRIEF DESCRIPTION OF THE DRAWINGS

FIGS. 6A, 6B and 6C are diagrams illustrating the structure of a fourth modification example of an optical fiber sensor according to the first embodiment of the present invention.

PREFERRED EMBODIMENTS OF THE INVENTION

Figure 1:
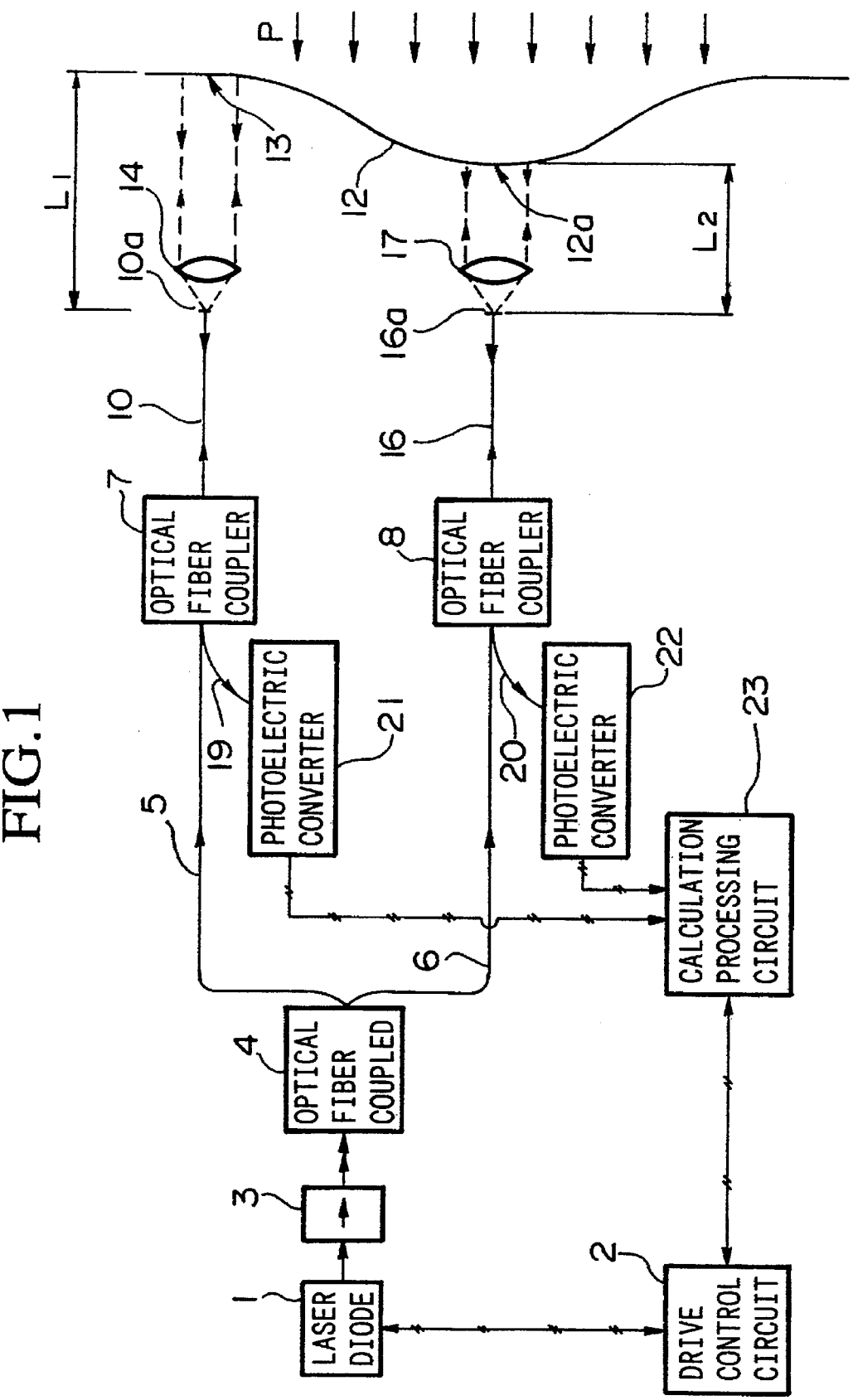
FIG. 1 is a block diagram illustrating the structure of an optical fiber sensor according to the first embodiment of the present invention.

The first embodiment of the present invention will be explained below with reference to the drawings. FIG. 1 is a block diagram illustrating the structure of the optical fiber sensor for measuring pressure or displacement according to the first embodiment of the present invention. In the drawing, reference numeral 1 indicates a laser diode. Reference numeral 2 indicates a drive control circuit for driving the laser diode 1, containing a power source circuit, a temperature control circuit, and a frequency modulation circuit. Output beams from the laser diode 1 pass through an optical isolator 3 if needed, and are connected to an optical fiber coupler 4 so as to efficiently input light thereto (the explanation of the optical collimation system used in this case will be omitted). Optical fibers 5, 6 are connected to the optical fiber coupler 4, and these are respectively connected to optical fiber couplers 7, 8.

The opposite end surface 10a of an optical fiber 10 which is connected to the optical fiber coupler (optical beam divider/combiner) 7 is positioned perpendicular to a peripheral portion 13 of a diaphragm 12 where there is no deformation caused by pressure P. A collimating lens 14 is inserted between the end surface 10a of the optical fiber 10 and the peripheral portion 13.

On the other hand, the opposite end surface 16a of an optical fiber 16 which is connected to the optical fiber coupler (optical beam divider/combiner) 8 is positioned perpendicular to a central portion 12a of the diaphragm 12 where the deformation caused by the pressure P is the greatest. A collimating lens 17 is inserted between the end surface 16a of the optical fiber 16 and the central portion 12a of the diaphragm 12. Additionally, a reflecting film (for example, a gold coating) having the most suitable reflectance may be coated onto the central portion 12a and peripheral portion 13 of the diaphragm 12 if needed. Furthermore, the end surfaces 10a, 16a of the optical fibers 10, 16 are both polished flat. Of course, the structure may be such as not to be provided with the above-mentioned collimating lenses 14, 17 or the reflecting film.

The ends of optical fibers 19, 20 are respectively connected to optical fiber terminals on the laser diode 1 sides of the optical fiber couplers 7, 8. The opposite ends of these optical fibers 19, 20 are respectively connected to photoelectric converters 21, 22. The photoelectric converters 21, 22 are both electrically connected to a calculation processing circuit 23. The calculation processing circuit 23 has the functions of measuring the beat frequencies of the electrical signals supplied from the photoelectric converters 21, 22, calculating the distances $L_1$ and $L_2$ (see FIG. 1) from the beat frequencies, and calculating a pressure value by determining the amount of deformation of the diaphragm 12 from the difference between the distances $L_1$ and $L_2$.

The origins of the distances $L_1$ and $L_2$ on the end surfaces 10a, 16a of the optical fibers 10, 16 do not necessarily have to be exactly aligned. This is because the difference between the origins $\Delta L_{12}$ (not shown in the drawings) can be processed as a bias distance by calibration prior to measurement, so as not to influence the results of the measurement. In the explanations given herebelow, the descriptions of such calibration procedures will be omitted. Additionally, the calculation processing circuit 23 has functions for obtaining temperature data from the value of the distance $L_1$ and performing pressure/temperature compensation calculations, and is electrically connected to the above-mentioned drive control circuit 2.

Hereinbelow, the above-described optical path made up of the optical fiber 5, the optical fiber coupler 7, the optical fiber 10, the collimating lens 14, and the photoelectric converter 21 will be referred to as the standard optical path. The optical path made up of the optical fiber 6, the optical fiber coupler 8, the optical fiber 16, the collimating lens 17, and the photoelectric converter 22 will be referred to as the pressure detection optical path. The optical fiber couplers 7, 8 may be replaced by optical multiplexer/demultiplexers if necessary.

The operation of the above-described optical fiber sensor will be explained next. The drive control circuit 2 controls the temperature around the laser diode 1 and modulates the input electrical current so that the central frequency of the laser beam outputted from the laser diode 1 is equal to $v_0$ (for example, if the central wavelength $\lambda_0 = 850$ nm and assuming the velocity of light $c \approx 3 \times 10^{17}$ nm/s, then $v_0 = c/\lambda_0 = 3.53 \times 10^{14}$ Hz), the frequency deviation width of the laser beam is equal to $\Delta v$ (for example, the value of $\Delta v$ can be in the range of about a few dozen GHz to a few THz; it is usually made as large as possible if high precision is required), and the laser diode sweep frequency of triangular waves at a frequency deviation width $\Delta v$ is equal to $f_m$ (the settings change depending upon the value of the range of beat frequencies which are trying to be obtained). That is, the drive control circuit 2 applies a frequency modulation to the laser diode 1 based on the parameters of the central frequency $v_0$, the frequency deviation width $\Delta v$, and the laser diode sweep frequency $f_m$ (triangular waves). The laser beam from this laser diode 1 is inputted to the optical fiber coupler 4, usually after passing through an optical isolator 3 for preventing return light. Then, the laser beam is split by the optical fiber coupler 4, and is led to the optical fiber couplers 7, 8 by the optical fibers 5, 6.

After passing through the optical fiber coupler 7, the laser beam passes through the optical fiber 10 and is released from the end surface 10 to become a spatial beam. Then the beam is collimated by passing through the collimating lens 14 and is reflected at the undeformed peripheral portion 13 of the diaphragm 12 to return. This reflected beam passes through the collimating lens 14 and is incident on the end surface 10a of the optical fiber 10 as a reflected re-input beam. Additionally, when a laser beam is outputted from the end surface 10a of the optical fiber 10, a portion of the laser beam is reflected at the end surface 10a and returns to the optical fiber coupler 7 side through the optical fiber 10 as a reference beam. The reference beam and the reflected re-input beam are transmitted through the optical fiber 10 as an interference beam which is led to the optical fiber 19 side by the optical fiber coupler 7 and is inputted to the photoelectric converter 21.

The photoelectric converter 21 converts the interference beam into an electrical signal with a beat frequency $f_{b1}$ which is outputted to the calculation processing circuit 23. The calculation processing circuit 23 measures the frequency of the inputted electrical signal, i.e. the above-mentioned beat frequency $f_{b1}$.

Figure 2A:
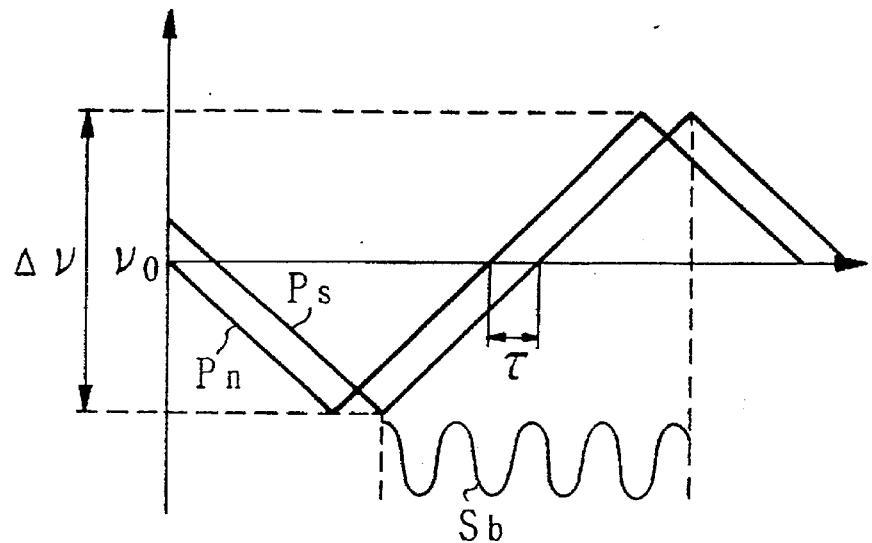
FIGS. 2A–2D are diagrams explaining a beat frequency measurement method of a calculation processing circuit 23 shown in FIG. 1.
Figure 2B:
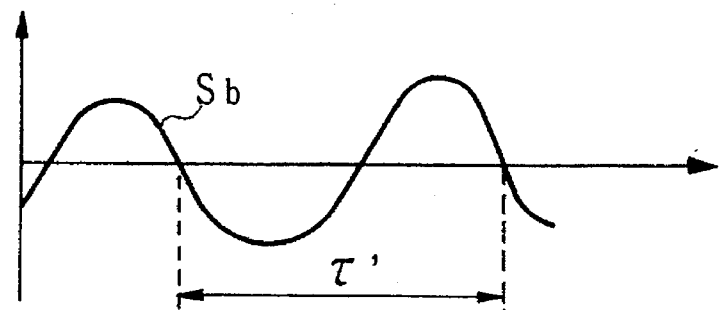
Figure 2C:
Figure 2D:
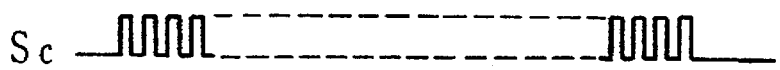

Here, an example of a calculation method for the beat frequency $f_{b1}$ will be explained with reference to FIGS. 2A through 2D. In FIG. 2A, $P_n$ refers to the reference beam reflected at the end surface 10a of the optical fiber 10, $P_s$ refers to the reflected re-input beam reflected at the peripheral portion 13 of the diaphragm 12 and incident on the end surface 10a of the optical fiber 10, and $\tau$ refers to the time lag between the reference beam $P_n$ and the reflected re-input beam $P_s$ resulting from the optical path length difference. Additionally, $S_b$ refers to the electrical signal (beat frequency $f_{b1}$) supplied from the photoelectric converter 21 to the calculation processing circuit 23. The calculation processing circuit 23 turns the gate signal $S_g$ shown in FIG. 2C on for N periods (N=1 in the drawing) of the waveform of the electrical signal $S_b$ shown in FIG. 2B. While the gate signal $S_g$ is turned on, the clock signal $S_c$ is counted (for example, the clock frequency can be 100 MHz), and the beat frequency $f_{b1}$ of the electrical signal $S_b$ is determined from the reciprocal of the count value. In this particular example, the beat frequency $f_{b1}$ (=1/$\tau$) is able to be measured at a resolution of $100 \times 10^6$.

The calculation processing circuit 23 then determines the distance $L_1$ by a conventional FM (frequency modulation) heterodyne measurement method. That is, the distance $L_1$ is calculated according to the following Formula (1):

$$L_1 = \frac{cf_{b1}}{4f_m \cdot \Delta v} \quad (1)$$

wherein c represents the speed of light.

On the other hand, as with the laser beam which passes through the optical fiber coupler 7, the laser beam which passes through the optical fiber coupler 8 continues through the optical fiber 16 and the collimating lens 17, is reflected at the central portion 12a of the diaphragm 12, and returns to the end surface 16a of the optical fiber 16 as a reflected re-input beam. Additionally, when the laser beam is outputted through the end surface 16a of the optical fiber 16, a portion of the laser beam is reflected by the end surface 16a and returns to the optical fiber 16 as a reference beam. Then, the reflected re-input beam and the reference beam propagate through the optical fiber 16 as an interference beam which is transmitted to the optical fiber 20 side by means of the optical fiber coupler 8 and is inputted to the photoelectric converter 22.

The photoelectric converter 22 converts the interference beam into an electrical signal having a beat frequency $f_{b2}$ and outputs the electrical signal is outputted to the calculation processing circuit 23. The calculation processing circuit 23 measures the frequency of the input electrical signal, i.e. measures the beat frequency $f_{b2}$ in the same manner as the beat frequency $f_{b1}$ was calculated above, and calculates the distance $L_2$ by means of Formula (2):

$$L_2 = \frac{cf_{b2}}{4f_m \cdot \Delta v} \quad (2)$$

The above-mentioned distances $L_1$ and $L_2$ are actually half of the values of the optical path lengths, and the calculation processing circuit 23 determines the ranges by correcting the distances $L_1$ and $L_2$ according to the refractive index distribution along the optical path (for example, if the refractive indices n of the collimating lenses 14 and 17 are equal to 1.8 and they are 3 mm thick, then the optical path length would be $2 \times 1.8 \times 3 = 10.8$ mm). In order to simplify the explanation below, the distances $L_1$ and $L_2$ will henceforth represent the corrected ranges.

Next, the calculation processing circuit 23 determines the difference between the distances $L_1$ and $L_2$ calculated from the Formulas (1) and (2). This difference is the displacement of the diaphragm 12 without the influence of thermal expansion. The influence of thermal expansion will be explained below. Subsequently, the calculation processing circuit 23 determines the pressure P, the object of measurement, by means of the following Formula (3). This Formula (3) is a formula for determining the pressure in the case that the diaphragm 12 is circular and fixed along its circumference.

$$P = \frac{64D}{a^4} \cdot (L_1 - L_2) \quad (3)$$

In the above Formula (3), D represents the flexural rigidity of the diaphragm 12. This flexural rigidity can be calculated from the following Formula (4).

$$D = \frac{Eh^3}{12(1-u^2)} \quad (4)$$

In this Formula (4), E represents Young's modulus (the modulus of longitudinal elasticity), h represents the thickness of the diaphragm 12, and u represents the Poisson ratio of the material forming the diaphragm 12. Additionally, assuming the Poisson ratio u in Formula (4) to be equal to 0.3, then the pressure P can be determined by using the following Formula (5).

$$P = \frac{Eh^3}{0.171a^4} \cdot (L_1 - L_2) \quad (5)$$

Figure 3A:
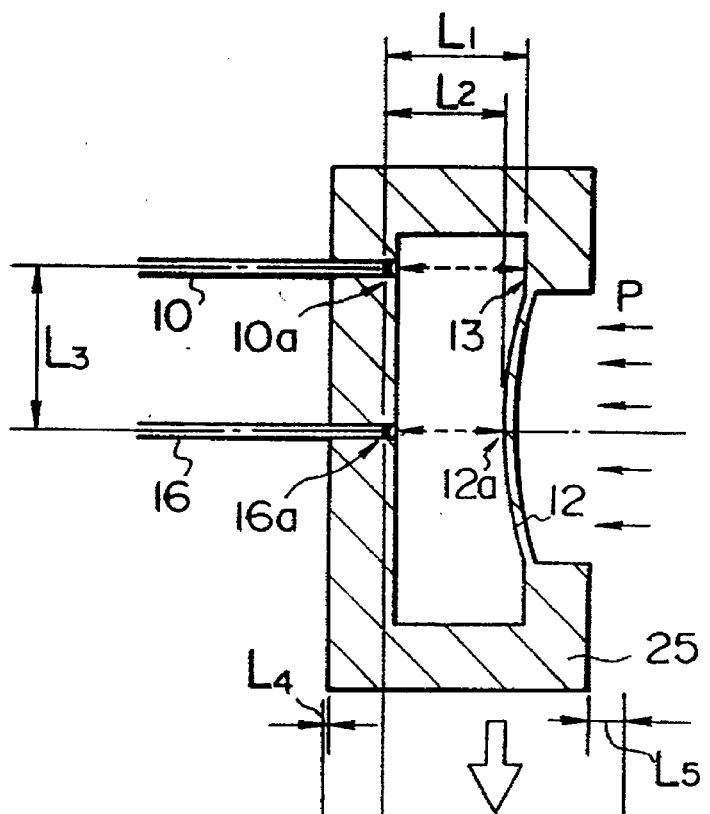
FIGS. 3A and 3B are diagrams explaining that the distances $L_1$ and $L_2$ shown in FIG. 1 are diaphragm displacements which are not influenced by thermal expansion.
Figure 3B:
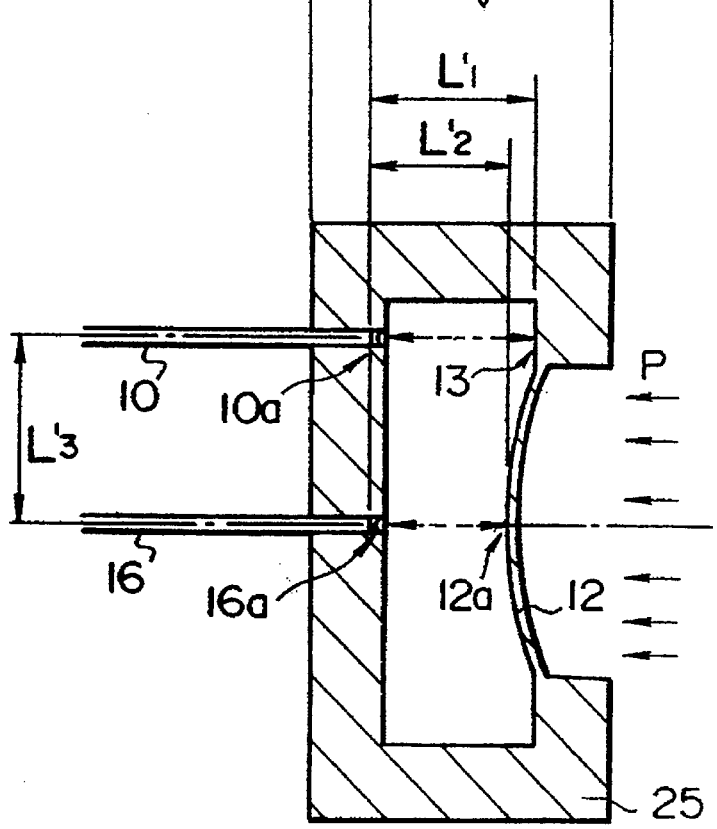

Next, it will be explained with reference to FIG. 3 that the difference between the distances $L_1$ and $L_2$ is the displacement of the diaphragm 12 without the influence of thermal expansion. FIGS. 3A and 3B are diagrams showing the structure in the vicinity of optical fibers 10, 16 and the diaphragm 12; FIG. 3A shows the state in which the temperature around the diaphragm 12 is at $T_1$, and FIG. 3B shows the state in which the temperature around the diaphragm 12 is at $T_2$ which is greater than $T_1$ by the amount $\Delta T$. FIG. 3B shows the thermal expansion value (=$L_4+L_5$) along the axial direction of the body 25 in an exaggerated fashion. In these drawings, $L_1'$ is the distance between the end surface 10a of the optical fiber 10 and the peripheral portion 13 of the diaphragm 12, while $L_2'$ is the distance between the end surface 16a of the optical fiber 16 and the central portion 12a of the diaphragm 12. Additionally, the diaphragm 12 and the body 25 are formed from the same material.

With the above structure, the distances $L_1'$ and $L_2'$ at temperature $T_2$ in FIG. 3B can be determined from Formulas (6) and (7) when the diaphragm 12 and the body 25 are of the same material (or the same thermal expansion rate $\alpha$).

$$L_1' = L_1(1+\Delta T \cdot \alpha) \quad (6)$$

$$L_2' = L_1(1+\Delta T \cdot \alpha) \quad (7)$$

Therefore, the difference between the distances $L_1'$ and $L_2'$, i.e. the amount of deformation of the diaphragm 12, can be determined from Formula (8).

$$L_1' - L_2' = (L_1 - L_2) + \Delta T(L_1 - L_2)\alpha \quad (8)$$

In this case, the value $(L_1-L_2)\alpha$ of the second term on the right side of Formula (8) is extremely small, so it may be ignored and Formula (8) can be represented by the approximation of Formula (9).

$$L_1' - L_2' \approx L_1 - L_2 \quad (9)$$

That is, Formula (9) indicates that the amount of deformation of the diaphragm 12 is not affected (strictly speaking, only minutely affected) even if the diaphragm 12 and the body 25 undergo thermal expansion (or contraction).

On the other hand, while the distance $L_3$ in the radial direction of the body 25 (see FIG. 3A) changes to $L_3' = L_3(1+\Delta T\alpha)$ (see FIG. 3B) due to changes in the environmental temperature, the distance in the radial direction of the diaphragm 12 also changes in a manner identical to the change in the radial direction of the body 25. Consequently, there is no change in the position of the central portion 12a of the diaphragm as measured, even if the environmental temperature changes, so there is no influence due to thermal expansion.

Next, the pressure/temperature compensation of the standard optical path (the optical path of the optical fiber 10 side) will be explained. First, after determining the distance $L_1$ at an environmental temperature of $T_1$ according to Formula (1) with reference to FIG. 3A, the calculation processing circuit 23 determines the distance $L_1'$ at an arbitrary environmental temperature of $T_2$ from Formula (1) in the same manner, with reference to FIG. 3B. Then, the temperature change $\Delta T$ can be determined by substituting the distances $L_1$ and $L_1'$ as well as the pre-known thermal expansion rate $\alpha$ into the equation $L_1'=L_1(1+\Delta T\alpha)$ of Formula (6). As a result, the environmental temperature $T_2$ can be determined by adding $\Delta T$ to the environmental temperature value $T_1$.

Thus, the pressure/temperature correction coefficients for each temperature stage can be pre-stored in a memory element such as a ROM (read-only memory) and the current environmental temperature (temperature data) can be determined from the measurement values of the standard optical path. Then, the correction coefficient for the determined temperature can be read from the ROM and the correction coefficient multiplied with the pressure P determined from Formula (3) (or Formula (5)) in order to perform a temperature compensation by means of a compensation calculation. As a result, a pressure measurement without (or with extremely few) measurement errors due to temperature changes can be performed over a wide temperature range. In this case, the temperature compensation range extend over a range of approximately −60° C.~1000° C., and the measurement precision may be in the class of ±0.1%.

Next, various modification examples of the optical fiber sensor according to the above-described embodiment of the present invention will be explained.

Modification Example 1

The first modification example relates to pressure sensors.

(1) With the above-described embodiment, it is possible to measure gauge pressure, differential pressure and absolute pressure. That is, with reference to FIG. 4, (a) a gauge-type pressure sensor can be made by forming a hole w on the opposite side of the pressure receiving surface of the diaphragm 12, i.e. passing from one end surface of the body 25 to which the optical fibers 10, 16 are connected to the interior of the body 25, and making it open to the atmosphere; (b) a differential-type pressure sensor can be made by conveying a secondary pressure P' to the opposite side of the pressure receiving surface of the diaphragm 12; and (c) an absolute-type pressure sensor can be made by vacuum sealing the hole w mentioned in (a) above and forming a vacuum on the reverse surface of the diaphragm 12.

(2) While a flat circular disc-shaped diaphragm 12 was used in the above-described embodiment in order to simplify the explanation, there is no restriction thereto and any shape is acceptable. For example, polygonal diaphragms or disc-shaped diaphragms with wave-form cross-sections can be used.

(3) While a diaphragm 12 was used as the pressure receiving mechanism in the above-described embodiment, there is no restriction thereto and any material which is elastically deformed by pressure is acceptable. For example, the pressure receiving mechanism may be .formed from a bellows or the like.

(4) While the material of the pressure sensor detection tip (diaphragm 12 and body 25) was not especially mentioned in the above-described embodiment, but any of the following elastic materials is acceptable: (a) stainless steel, hastelloy, and constant elasticity metallic materials such as Ni-SPAN-C and YNIC; (b) glass/ceramic materials such as fused quartz, sapphire and zirconia; (c) semiconductor/ optical IC-type materials such as silicon, silicon dioxide and lithium niobate; and (d) plastic materials.

Modification Example 2

The second modification example principally relates to FM heterodyning and range finding.

(1) While the type of laser diode in the above-described embodiment was not specified and simply referred to as the laser diode 1 (see FIG. 1), it is possible to use the following types of laser diodes in addition to those which are commonly used (i.e. single-mode laser diodes which are not able to have very large frequency deviation bandwidths and therefore have tendency to mode-hop). Since the following laser diodes do not mode-hop and their laser beams have large frequency deviation bandwidths in comparison to common laser diodes, it is preferable to use the following laser diodes as the laser diode 1 if performance is to be stressed: (a) a DFB-LD (distributed feedback laser diode) or (b) a DBR-LD (distributed Bragg reflector laser diode)

(2) While an FM heterodyning method was used in the above-described embodiment, this is identical to the range measurement principles for microwaves of the FMCW (frequency modulated continuous wave) method. Instead of using the FM heterodyning method, the range measurement may be performed according to the laser/radar methods disclosed in U.S. Pat. Ser. No. 5,294,075 issued to Boeing Corporation, the disclosure of which is hereby incorporated by reference. With the use of this laser/radar method, it is possible to obtain the effects of a multiplexed sensor using a multi-mode fiber.

(3) The above-described embodiment was explained with an example wherein the distances $L_1$ and $L_2$ shown in FIG. 1 are measured by means of a range measurement method. The reason for using this range measurement method is that unlike displacement measurement sensors, there is no possibility that the deformation change in the diaphragm 12 might become unclear if the power source supplying power to the optical fiber sensor is cut off, thus being advantageous in that a re-measurement is possible once the power returns. If the amount of deformation of the diaphragm 12 is calculated in a displacement calculation mode instead of the range measurement method, the change in deformation of the diaphragm 12 during power outages will become unknown. However, the deformation amount of the diaphragm 12 can be measured by means of this displacement measurement mode as long as power outages do not occur, such as when an auxiliary power source is installed. When the measurement is made by this displacement measurement mode, the deformation amount can be determined from a continuous displacement measurement, the displacement (deformation value $\Delta L$) being able to be determined from the following Formula (10):

$$\Delta L = \frac{c\Theta}{4\pi v_0} = \frac{\lambda_0 \Theta}{4\pi} \tag{10}$$

In the above Formula (10), $\Theta$ represents the temporal change $\theta(t_1) - \theta(t_2)$ wherein $1/f_m = t_2 - t_1$, and $\theta(t)$ represents the phase of the beat signal when the central frequency of the laser beam is $v_0$. This measurement according to the displacement measurement mode is known to generally be of higher precision than the range measurement method.

(4) While the frequency modulation waveform of the above-described embodiment is triangular, that is, the laser diode 1 is frequency modulated by triangular waves at a laser diode sweep frequency $f_m$, other types of modulation waveforms such as ramp waves (sawtooth waves) can be used for frequency modulation.

(5) For the measurement of the deformation value according to a displacement measurement as explained in paragraph (2) of modification example 2 above, the frequency modulation waveform need not be a triangular wave, and may be a sine wave. When the frequency modulation waveform is a sine wave, the displacement (deformation value) can be determined from calculation methods using Fourier series expansions. Methods for determining displacement using such calculation methods are of high speed and high precision.

Modification Example 3

The third modification example relates to optical fiber (Michelson) interferometers.

(1) While single-mode optical fibers or polarization-maintaining optical fibers are used as optical fibers 5, 6, 10, 16, 19 and 20 of FIG. 1 in the above-described embodiment, multi-mode optical fibers can be used instead of single-mode optical fibers or polarization-maintaining optical fibers if the above-mentioned laser/radar method is used.

(2) In the above-described embodiment, the portions in which optical fibers are used most effectively are near the end surfaces 10a and 16a of the optical fibers 10 and 16 shown in FIG. 1. Therefore, the optical path aside from the optical fibers 10 and 16 can be formed of spatial beams without using optical fibers, and beam splitters or the like can be used instead of the optical fiber couplers 7 and 8. In other words, a bulk optical system may be employed.

(3) While a fiber optic system made up of discrete parts is used in the above-described embodiment, all or some of the discrete parts can be replaced with optical IC materials such as lithium niobate in order to form optical integrated circuits, and to allow miniaturization by forming an opto-electronic integrated circuit including electronic ICs.

(4) While the measurement method of the above-described embodiment is based on a Michelson interferometer, but there is no restriction thereto, so that any other format, such as a Mach-Zehnder interferometer, is acceptable as long as a beat signal proportional to the distance is obtainable by using interference between a reference beam and a measurement beam.

(5) While collimating lenses 14 and 17 were provided at the respective end surfaces 10a and 16a of the optical fibers 10 and 16 in the above-described embodiment, the structure does not necessarily have to include the collimating lenses 14 and 17. Consequently, further miniaturization and weight reduction are possible. However, since the laser beams reflected at the reflecting surfaces (the peripheral portion 13 and the central portion 12a) of the diaphragm 12 tend to spread if there are no collimating lenses 14 and 17, the amount of light which is incident on the respective end surfaces 10a and 16a of the optical fibers 10 and 16 as reflected re-input light is reduced. In order to prevent this decrease in the amount of light, the end surfaces 10a and 16a of the optical fibers 10 and 16 must be provided closer to the peripheral portion 13 and the central portion 12a of the diaphragm 12 in order to collect an adequate amount of light from the reflected re-input beams. Furthermore, a collimating function can be conferred to the optical fiber to replace the discrete collimating lenses 14 and 17 (see FIG. 1) as will be explained below. Consequently, coherent beams are able to be obtained with compact and light-weight mechanisms.

Modification Example 4

The fourth modification example relates to the end surface reflection of the optical fibers.

(1) While the embodiment described above showed an example wherein the reflections from the end surfaces 10a and 16a formed by polishing flat the tips of the optical fibers 10 and 16 were used as reference beams, there is no restriction to such a format, so that single-layered or multi-layered coatings can be applied to the end surfaces 10a and 16a and the reflected beams from these coating surfaces can just as well be used as reference beams.

Figure 5A:
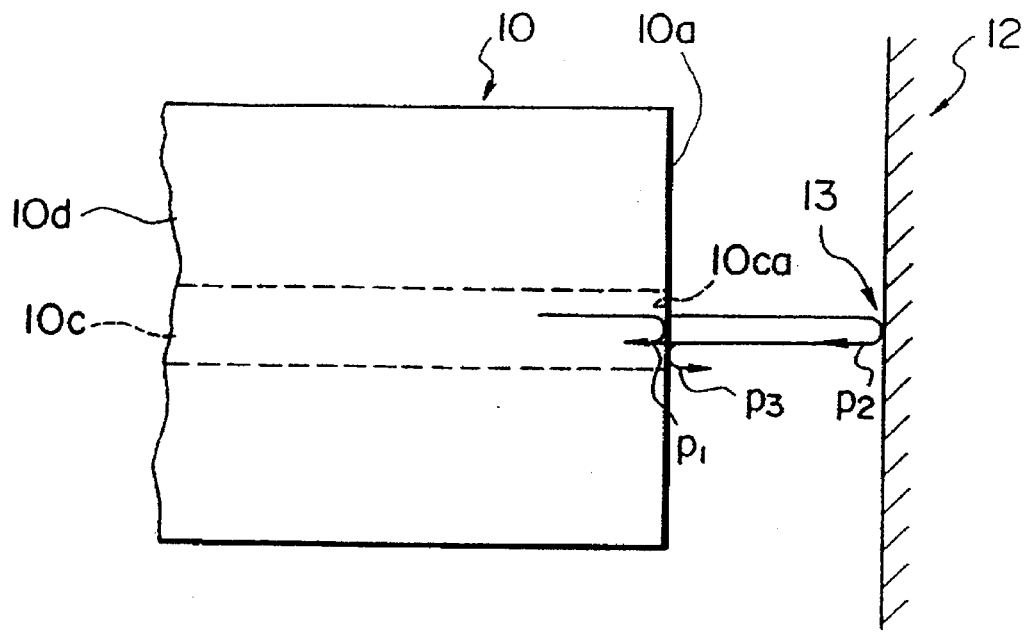
FIGS. 5A and 5B are diagrams illustrating the structure of a fourth modification example of an optical fiber sensor according to the first embodiment of the present invention.
Figure 5B:
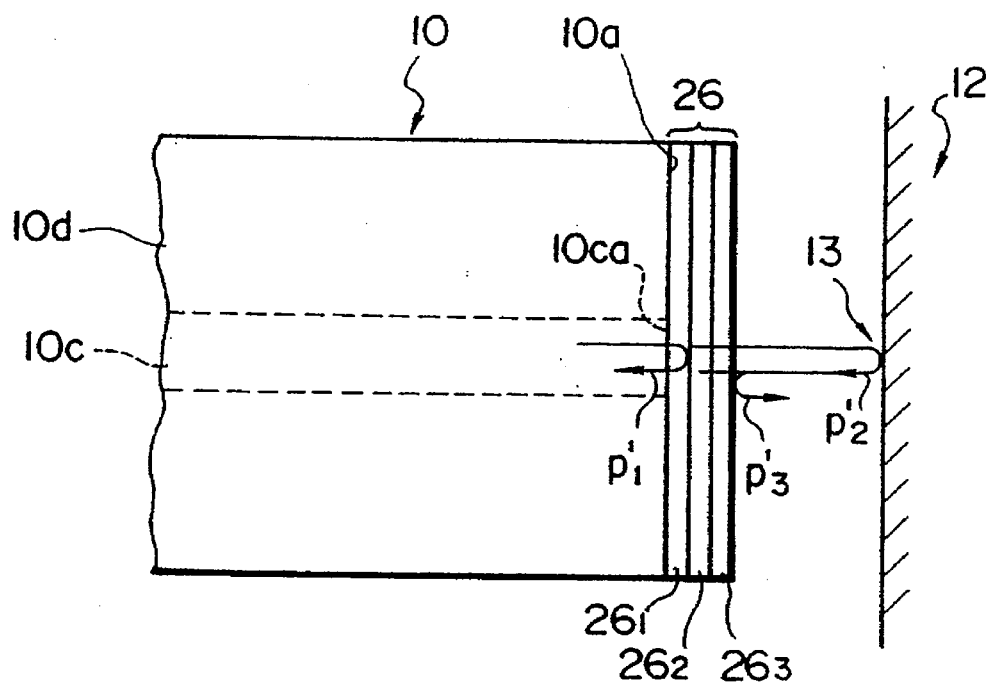

The structure and effects of this example will be explained with reference to FIG. 5. FIG. 5A is a side elevation showing the area around the end surface 10a of the optical fiber 10 of FIG. 1, wherein the collimating lens 14 of FIG. 1 has been omitted from the drawing. The optical fiber 10 is formed from a core 10c and a cladding 10d. In FIG. 5B, reference numeral 26 denotes a multi-layered coating wherein coating layers 261, 262 and 263 have been applied to the end surface 10a of the optical fiber 10 shown in FIG. 5A. The reflectance of this multi-layered coating 26 can be adjusted and the input loss for incident beams can be reduced by changing the materials used. The structure of the optical fiber 16 is identical.

In FIG. 5A, a laser beam which has propagated through the core 10c of the optical fiber 10 is emitted from the end surface 10ca of the core 10c. At this time, a portion (for example, 4%) of the laser beam is reflected at the end surface 10ca as an end surface reflected beam (reference beam) p1. The laser beam emitted from the end surface 10ca of the core 10c is reflected at the peripheral portion 13 of the diaphragm 12 as a reflected beam p2, and the reflected beam p2 is reflected back at the end surface 10ca of the core 10c as a re-reflected beam p3.

On the other hand, in FIG. 5B, the laser beam which has propagated through the core 10c of the optical fiber 10 passes through the end surface 10ca of the core 10c and is emitted from the end surface of the coating layer 263. At this time, a portion (for example, 8%) of the laser beam is reflected at the end surface of the coating layer 261 as an end surface reflected beam (reference beam) p1'. The laser beam emitted from the end surface of the coating layer 263 is reflected at the peripheral portion 13 of the diaphragm 12 as a reflected beam p2', and the reflected beam p2' is reflected at the end surface of the coating layer 263 as a re-reflected beam p3'.

The multi-layered coating 26 shown in FIG. 5B is formed to obtain one or some of the following effects: (a) to allow adjustment of the proportion of the beam returning into the core 10c of the optical fiber 10, i.e. the reference beam (from 4% to 8% in the above example); (b) to increase the input efficiency of the reflected beam p2' into the core 10c of the optical fiber 10 by reducing the reflectance of the multi-layered coating 26 with respect to the reflected beam p2' reflected at the peripheral portion 13 of the diaphragm 12; and (c) to prevent Fabry-Perot oscillations between the diaphragm 12 and the end surface 10c of the optical fiber 10 or the end surface of the multi-layered coating 26, thereby eliminating optical noise due to oscillatory interference generated by the Fabry-Perot oscillator.

(2) Aside from the structure shown in FIG. 5B explained above, the structure can be such that the beams are internally reflected within the optical fiber as will be explained below. (a) In FIG. 6A, reference numeral 10A is an optical fiber having a tapered cladding 10Ad. One end surface 10Ab of this optical fiber 10A is coupled to the end surface 10a of the optical fiber via a TiO$_2$ coating or the like by means of a splicing procedure. A portion of a laser beam which has propagated through the core 10c of the optical fiber 10 is reflected at the reflecting surface F as a reference beam. While omitted from FIG. 6A, the diaphragm 12 (see FIG. 1) is provided opposite the optical fiber 10A. (b) Additionally, the following structure can be added to the above-mentioned structure of FIG. 6A.

(3) The tip of the optical fiber 10A can be made to function as a collimator even without a separate collimating lens 14 (see FIG. 1) by the following method. This allows, simplification, miniaturization and weight reduction of the structure. (a) As shown in FIG. 6A, the tip (the end surface 10Aca of the core 10Ac) of the optical fiber 10A can be made approximately spherical so that a collimated beam pc is emitted from the tip. (b) In FIG. 6B, the optical fiber 10B is a gradient index optical fiber formed from a core 10Bc with a larger diameter than the core 10c of the optical fiber 10 and a cladding 10Bd covering the core 10Bc. The end surface 10Bb of this gradient index fiber 10B is coupled to the end surface 10a of the optical fiber 10 via a TiO$_2$ coating or the like by means of a splicing procedure. FIG. 6C shows the characteristics of the refractive index n of the gradient index optical fiber 10B along the line A—A' in FIG. 6B. While omitted from FIG. 6B, the diaphragm 12 (see FIG. 1) is provided opposite the gradient index optical fiber 10B.

In the diagram, a portion of a laser beam which has propagated through the core 10c of the optical fiber 10 is reflected at the reflecting surface F' as a reference beam, while the remaining laser beam continues through the core 10Bc of the gradient index optical fiber 10B to be emitted through the end surface 10Bca of the core 10Bc as a collimated beam pc'. In this way, a collimated beam pc' is able to be emitted in the same manner as if a lens has been separately provided, by splicing the gradient index optical fiber 10B onto the end surface 10a of the optical fiber 10. Alternatively, the structure can be made such that the end surface 10Bb of the gradient index optical fiber 10B is directly spliced onto the end surface 10a of the optical fiber 10 without supplying a TiO$_2$ coating therebetween, so that no reflecting surface F' is provided. In this case, a portion of a beam which has propagated through the core 10c of the optical fiber 10 is reflected at the end surface 10Bca of the core 10Bc of the gradient index optical fiber 10B as a reference beam, and the remaining laser beam is emitted from the end surface 10Bca as a collimated beam pc'. While explanations, to the effect that the collimated beams pc and pc' are reflected at their respective targets and are incident upon the respective end surfaces 10Aca and 10Bca of the optical fiber 10A and the gradient index optical fiber 10B as reflected re-input beams, have been omitted from the examples explained with reference to FIGS. 6A and 6B, these beams travel along optical paths in directions opposite to the collimated beams pc and pc'

Modification Example 5

The fifth modification example relates to the standard optical path, differential pressure gauges and temperature compensation.

(1) While an example wherein the precision is increased through temperature compensation of the measurement results was explained for the above embodiment, this type of temperature compensation is not necessary if high precision is not a requirement. As a result, the electrical circuit structure can be simplified and the weight can be reduced.

Figure 4:
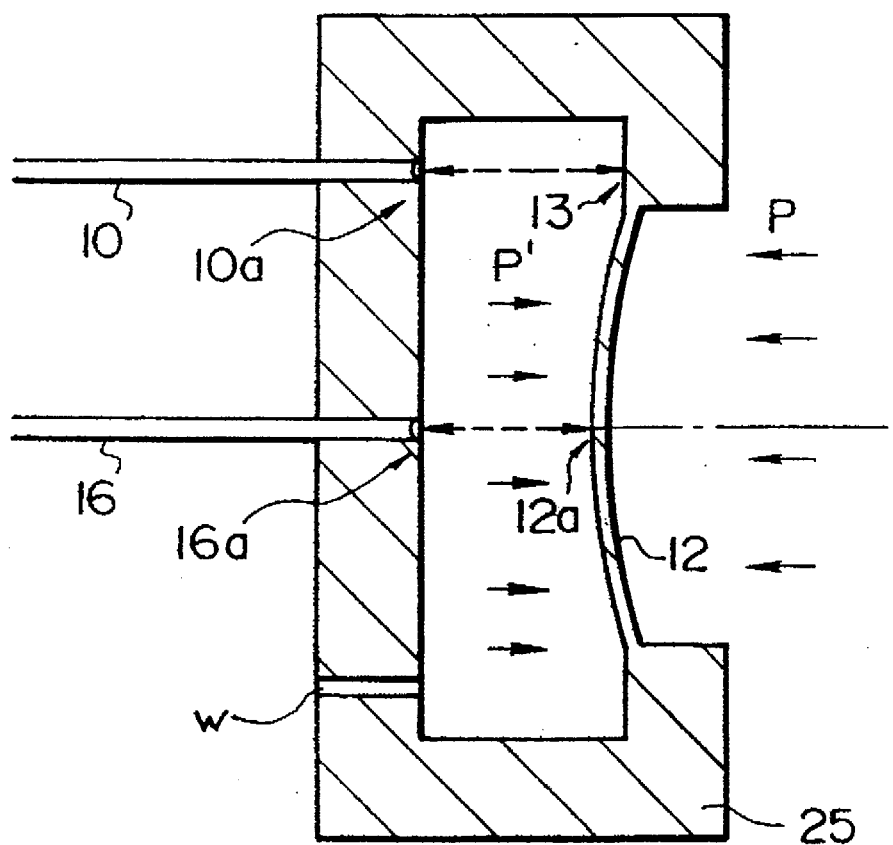
FIG. 4 is a sectional view illustrating the structure of a first modification example of an optical fiber sensor according to the first embodiment of the present invention.

(2) While a structural example for eliminating the influence of thermal expansion using two fiber interferometer systems, i.e. a standard optical path system and a pressure detection optical path system, was explained for the above embodiment, the structure can be provided with only a pressure detection optical path system, without having the optical fiber coupler 4 and the standard optical path system as shown in FIG. 4, if the environment is such as not to require any consideration of the influences of thermal expansion. As a result, the overall system of the optical fiber sensor can be simplified and miniaturized for weight reduction.

(3) While an example using the surrounding temperature calculated from the measurement value (distance $L_1$) of the standard optical path when performing temperature compensation of the measurement results was explained for the above embodiment, the temperature compensation can also be performed by using surrounding temperature data measured by means of other temperature sensors which are separate or internal to the optical fiber sensor.

Modification Example 6

(1) The order and method for calculating the pressure explained for the above embodiment merely form a single example for making the operation of the optical fiber sensor simple to understand. However, the order and method are not particularly restricted as long as the calculation is based on the fact that the beat frequency is proportional to the pressure because the beat frequency is proportional to the distance and the distance is proportional to the pressure. For example, while the pressure P was determined by means of Formulas (3) and (5) after determining the distances $L_1$ and $L_2$ by Formulas (1) and (2) in the above embodiment, there is no such restriction, and without determining the distances $L_1$ and $L_2$ by Formulas (1) and (2), the difference between the beat frequency $f_{b1}$ and the beat frequency $f_{b2}$ can be determined at the beat frequency stage, so that the coefficient $c/4f_m \cdot \Delta\nu$ of Formulas (1) and (2) can be multiplied into Formulas (3) and (5) in the calculation stage. In this case, the pressure P be determined from the following Formula (11). Additionally, the pressure/temperature compensation can be performed at the beat frequency stage as well.

$$P = \frac{Eh^3}{0.171a^4} \cdot \frac{c}{4f_m \cdot \Delta\nu} \cdot (f_{b1} - f_{b2}) \cdot k(T) \quad (11)$$

In the above Formula (11), k(T) indicates the correction coefficient.

Additionally, in the case wherein the difference between the beat frequency $f_{b1}$ and the beat frequency $f_{b2}$ is determined at the beat frequency stage, the pressure P can be determined by applying the following Formula (12), which is a general formula for determining distances L, to the distances $L_1$ and $L_2$ and substituting the distances $L_1$ and $L_2$ into Formula (5) to obtain Formula (13).

$$L = \frac{cN}{2\Delta\nu} \left( = \frac{N\lambda_e}{2} \right) \quad (12)$$

In the above Formula (12), N refers to the beat frequency (=$\Phi/2\pi$), wherein $\Phi$ is the integration value of the phase deviation of the beat waves which occur within a period of $\frac{1}{2}f_m$ (the frequency sweep time period of the laser diode 1 (See FIG. 1)). Additionally, $\lambda_e (=c/\Delta\nu)$ refers to the equivalent wavelength of the frequency-modulated optical waves.

$$P = \frac{Eh^3}{0.171a^4} \cdot \frac{c}{2 \cdot \Delta\nu} \cdot (N_1 - N_2) \quad (13)$$

The above-mentioned beat frequency measurement can be performed by means of a variety of methods such as an FFT (Fast Fourier Transform) operation method.

Figure 7:
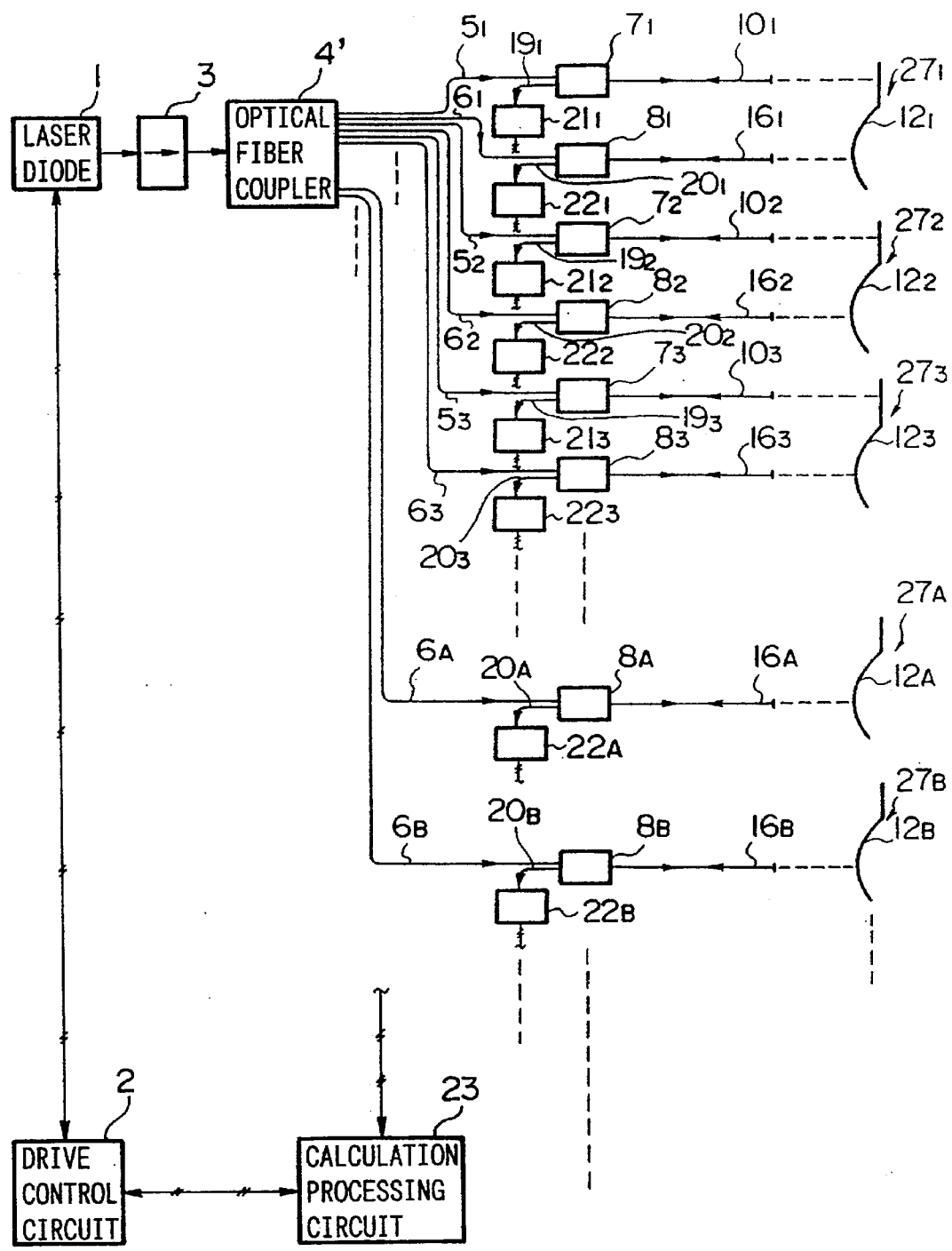
FIG. 7 is a block diagram illustrating the structure of a sixth modification example of an optical fiber sensor according to the first embodiment of the present invention.

(2) While the above first embodiment described a structural example of an optical fiber sensor wherein the pressure at only a single point is measured, there is no such restriction, and the structure can be such as to allow pressure measurement at multiple points as shown in FIG. 7. In FIG. 7, the portions corresponding to parts in FIG. 1 have been given the same reference numerals, and their explanations will be omitted. The optical fiber sensor shown in FIG. 7 shows a structure wherein the collimating lenses 14 and 17 of FIG. 1 are not provided or are not shown. Additionally, all of the photoelectric converters 211, 221, ..., 21A, 21B, ... have been omitted from the drawings, but they are respectively electrically connected to each calculation processing circuit 23. In FIG. 7, the pressure sensor portions 271, 272, ... are each formed from a standard optical path and a pressure detection optical path, but an explanation of their operation will be omitted because their operation is identical to that explained above with reference to FIG. 1. The standard optical paths have been omitted from the pressure sensor portions 27A, 27B, ..., which are only composed of pressure detection optical paths. Additionally, the composition of the optical fiber sensor shown in FIG. 7 allows the structures described in Modification Example 5, paragraphs (2) and (3) to be combined. Furthermore, the multi-point structure of the optical fiber sensor shown in FIG. 7 can be formed either by using only pressure sensor portions 271, 272, ... having standard optical paths, or by using only pressure sensor portions 27A, 27B, ... without standard optical paths.

Next, an example wherein the pressure sensor portions 271, 272, ... are used in combination with the pressure sensor portions 27A, 27B, ... will be explained. In order to simplify the explanation, an example wherein a total of 14 pressure sensor portions comprising 3 pressure sensor portions 271, 272 and 273 having both standard optical paths and pressure detection paths, and 11 pressure sensor portions 27A, 27B, ..., 27K having only pressure detection paths will be explained.

With this structure, the pressure sensor portions 271~273 are capable of measuring the amount of deformation of the diaphragms 121~123 and performing temperature compensation by means of the standard optical paths without being influenced by the environmental temperature, as with the above-described embodiment. In this case, assuming that the environmental temperature around the 14 pressure sensor portions 271~273 and 27A~27K is approximately uniform, it is possible to obtain distance and temperature data for one or two (or three) of the pressure sensors 271~273 from the standard optical paths(a majority redundancy of 2 out of 3 is usually used). If this temperature data is applied to the temperature compensation of the pressure sensor portions 27A~27K which do not have standard optical paths, then it is possible to perform a temperature compensation on all 14 pressure sensor portions, including pressure sensor portions 27A~27K. That is, by using the pressure sensor portions 271~273 having standard optical paths together with the pressure sensor portions 27A~27K which do not have standard optical paths, a temperature compensation can be applied to all of the pressure sensor portions 271~273 and 27A~27K, while the overall system can be simplified and miniaturized for weight reduction according to the number (11 in this case) of pressure sensor portions 27A~27K which do not have standard optical paths. In the case of the structure shown in FIG. 7, the pressure characteristics, temperature characteristics and optical pathlengths of all of the diaphragms 121~123 and 12A~12K should be made as uniform as possible and be within the range of allowable errors. Additionally, miniaturization and weight reduction can be obtained for this multi-point structure by making use of optoelectronic ICs as explained in paragraph (3) of Modification Example 3.

(3) A plurality of pressure sensors can be used for measurement by frequency multiplexing, if a laser/radar method as explained in paragraph (2) of Modification Example 2 is used for optical pathlength measurement.

(4) While the above embodiment described an example wherein the sensor is a pressure sensor, the present invention is also applicable to the following types of optical sensors, since the optical fiber sensor of the embodiment is basically an optical sensor which measures distance and displacement: distance and displacement sensors, position sensors, temperature sensors (using the standard optical paths of the pressure sensors) and gap sensors (for measuring distances between objects).

Modification Example 7

Figure 8:
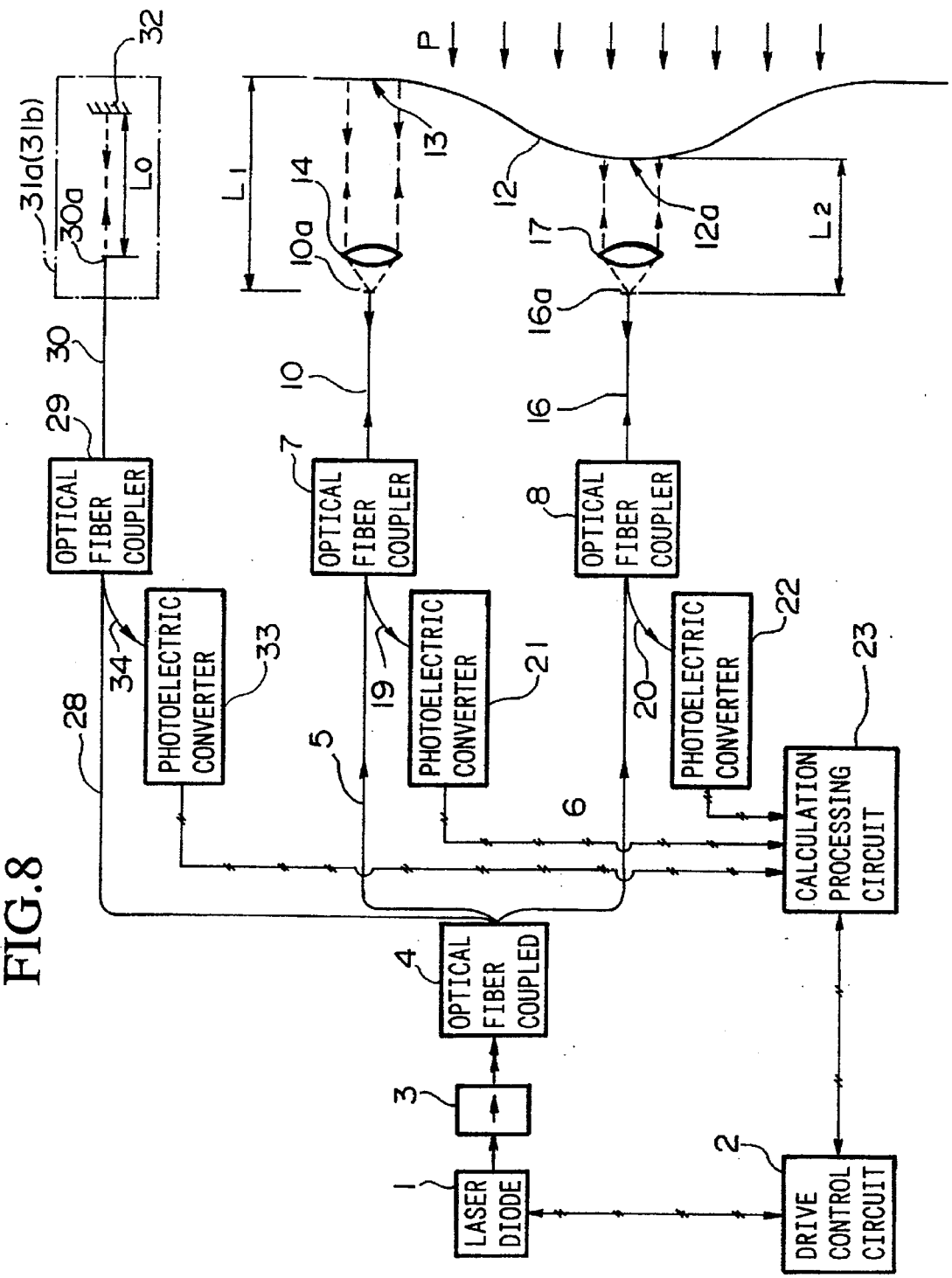
FIG. 8 is a block diagram illustrating the structure of a seventh modification example of an optical fiber sensor according to the first embodiment of the present invention.

FIG. 8 is a diagram showing the structure of the seventh modification example of the optical fiber sensor according to the above embodiment of the present invention. The portions in the diagram which correspond to parts in FIG. 1 have been given the same reference numerals and their explanations will be omitted. In the optical fiber sensor of FIG. 8, an optical fiber 28, an optical fiber coupler 29, an optical fiber 30, a target 32, a photoelectric converter 33 and an optical fiber 34 have been added.

In the drawing, the optical fiber coupler 4 is connected to the optical fiber 29 by means of the optical fiber 28, and one end of the optical fiber 30 is connected to one end of the optical fiber coupler 29. The end surface 30a of the other end of the optical fiber 30 is provided so as to oppose the target 32 with a standard distance therebetween. This target 32 is provided for reflecting laser beams from its surface. Herebelow, the path between the end surface 30a of the optical fiber 30 and the target 32 will be referred to as the nominal optical path. This nominal optical path is provided for reducing the influence of fluctuations in the frequency deviation $\Delta v$ of the laser diode 1 order to improve the measurement precision.

With the above structure, the drive control circuit 2 drives the laser diode 1 in the same manner as with the above embodiment and causes a laser beam to be emitted from the laser diode 1. The laser beam from the laser diode 1 is inputted to the optical fiber coupler 4 through the optical isolator 3. Then, the laser beam is divided into three parts by means of the optical fiber coupler 4, and is transmitted to the optical fiber couplers 7, 8 and 29 via the optical fibers 5, 6 and 28. Since the operation after the laser beams have passed through the optical fiber couplers 7 and 8 is identical to that of the above embodiment, the explanation will be omitted.

On the other hand, the laser beam which has passed through the optical fiber coupler 29 propagates through the optical fiber 30 to be emitted from the end surface 30a as a spatial beam, which is then reflected at the surface of the target 32. This reflected beam is incident on the end surface 30a of the optical fiber 30 as a reflected re-input beam. Additionally, when the laser beam is emitted from the end surface 30a of the optical fiber 30, a portion of the laser beam is reflected by the end surface 30a and returns into the optical fiber 30 as a reference beam. Then, this reference beam and the reflected re-input beam form an interference beam which propagates through the optical fiber 30 and is transmitted to the optical fiber 34 side by means of the optical fiber coupler 29 to be inputted to the photoelectric converter 33.

The photoelectric converter 33 converts the interference beam into an electrical signal with a beat frequency $f_{b0}$ which is then outputted to the calculation processing circuit 23. The calculation processing circuit 23 measures the beat frequency $f_{b0}$ by the above-mentioned measurement method, and feeds the beat frequency $f_{b0}$ back to the drive control circuit 2. The drive control circuit 2 controls the laser diode 1 so that the beat frequency $f_{b0}$ is held constant. As a result, a laser beam which is not influenced by fluctuations in the central frequency $v_0$ and frequency deviation $\Delta v$ is emitted from the laser diode 1, thereby improving the measurement precision of the beat frequencies $f_{b1}$ and $f_{b2}$ of the electrical signals supplied from the photoelectric converters 21 and 22. Thus, the measurement precision of the distances $L_1$ and $L_2$ is improved and a high-precision optical fiber sensor is able to be realized.

Furthermore, when making such high-precision measurements, the beat frequencies $f_{b1}$ and $f_{b2}$ are comparatively measured with the beat frequency $f_{b0}$ which has been affected by fluctuation errors as a reference. In other words, the beat frequencies $f_{b1}$ and $f_{b2}$ are measured with the nominal optical pathlength ($2L_0$) as the reference, so that an extremely high-precision range measurement is possible. In the above-described seventh modification example, while a method for driving the laser diode 1 so that the beat frequency $f_{b0}$ is constant and a method wherein $f_{b1}$ and $f_{b2}$ are measured with the beat frequency $f_{b0}$ as a reference were explained, one or both of the methods may be used as is required.

While Modification Example 7 described an example wherein the nominal optical path, the standard optical path and the pressure detection optical path are placed under identical conditions, there is no such restriction, and the follow structures are possible for the purpose of ensuring high precision.

For example, the structure can be such that the nominal optical path, i.e. the area around the end surface 30a of the optical fiber 30 and the target 32, is supported by a low thermal expansion composition 31a indicated by the single-dotted chain line in FIG. 8, thereby holding the physical distance between the end surface 32a of the optical fiber 32 and the surface of the target 32 constant. As this low thermal expansion composition 31a, Nobinite (trade name) or 90% platinum, 10% iridium alloys or the like used as material for meter standards can be used. Consequently, more precise measurements are possible over a wide range of temperatures because the distance is kept approximately constant.

Alternatively, a thermostatic apparatus 31b which is maintained at a constant temperature may be provided instead of the low thermal expansion composition 31a, with the nominal optical path being provided inside the thermostatic apparatus 31b. Consequently, the nominal optical path receives very little influence from refractive index changes due to atmospheric fluctuations other than atmospheric pressure changes, so that the optical pathlength of the nominal optical path $L_0$ between the end surface 30a of the optical fiber 30 and the surface of the target 32 is held approximately constant. Additionally, while not shown in the diagrams, the distance between the end surface 30a of the optical fiber 30 and the surface of the target 32 is made approximately constant since the contraction of the support members supporting the area around the end surface 30a of the optical fiber 30 and the target 32 is almost eliminated. As a result, a high-precision measurement is possible even without using any special low thermal expansion compositions.

Furthermore, the nominal optical path can be made a vacuum by providing the end surface 30a vicinity of the optical fiber 30 and the target 32 inside a vacuum apparatus not shown in the drawings. As a result, the nominal optical path is absolutely unaffected by changes in the refractive index due to atmospheric fluctuations, thereby making the optical pathlength $L_0$ constant and allowing a high-precision measurement.

While a structure with only a nominal optical path, a structure provided with a low thermal expansion composition 31a, a structure provided with a thermostatic apparatus 31b and a structure provided with a nominal optical path in a vacuum have been explained, it is possible to combine the three structures wherein the nominal optical path is provided within a low thermal expansion composition 31a, a thermostatic apparatus 31b and a vacuum in different configurations depending upon the required measurement precision. For example, the following structures are possible. (a) The end surface 30a area of the optical fiber 30 and the target 32 can be supported by a low thermal expansion composition 31a and the low thermal expansion composition 31a provided inside a thermostatic apparatus 31b. As a result, the physical distance between the end surface 30a of the optical fiber 30 and the surface of the target 32 is held approximately constant with almost no influence due to temperature, thereby allowing more precise measurements. (b) The end surface 30a area of the optical fiber 30 and the target 32 can be supported by a low thermal expansion composition 31a and the inside of the low thermal expansion composition 31a can be made a vacuum. As a result, the physical distance between the end surface 30a of the optical fiber 30 and the surface of the target 32 is held approximately constant, and the optical pathlength $L_0$ can be held constant because it is absolutely unaffected by refractive index changes due to atmospheric fluctuations. This allows high-precision measurements to be performed by a simple structure. (c) In addition to the structure described in (b) above, the low thermal expansion composition 31a can be provided within a thermostatic apparatus 31b. As a result, the physical distance between the end surface 30a of the optical fiber 30 and the surface of the target 32 is almost unaffected by temperature and is thus held approximately constant, and the optical pathlength $L_0$ is held constant because it is absolutely unaffected by refractive index changes due to atmospheric fluctuations, thereby allowing extremely high-precision measurements.

While explanations of the embodiments of the present invention have been given above with reference to the drawings, the detailed structure need not be restricted thereto, and design modifications can be made as long as they do not deviate from the gist of the invention. For example, the optical fiber sensor of the present invention can be made by combining one or a plurality of the above embodiment and the seven modification examples. Additionally, while the object of measurement in the above embodiment and the seven modification examples of the present invention was pressure, there is no such restriction, and any object of measurement is possible as long as it is based in distance measurements.

Since the same laser beam generated by the laser diode 1 propagates through the standard optical path and the pressure detection optical path according to the above-described embodiment and modification examples of the present invention, the influences of errors and variations in the central frequency $v_0$ and the frequency deviation width $\Delta v$ of the laser beam as well as the laser diode sweep frequency $f_m$ are under the same conditions for the standard optical paths and the pressure detection optical paths, so that measurement errors can be reduced in comparison with cases wherein laser beams generated by separate laser diodes are transmitted through the respective standard optical paths and pressure detection optical paths. Furthermore, the influence of fluctuations in the frequency deviation width $\Delta v$ can be eliminated by adding standard optical paths, thereby improving the measurement precision. Additionally, in the case of optical fiber sensors, the central frequency $v_0$, the frequency deviation width $\Delta v$ and the laser diode sweep frequency $f_m$ do not each require high precision of an absolute value, and they may have respective errors above the absolute values as long as they are such as to keep the coefficient k, multiplied against the beat frequency $f_b$ in the following Formula (14), stable. Additionally, this coefficient k can be calibrated depending upon the required precision prior to using the optical fiber sensor.

$$L = \left( \frac{c}{4f_m \cdot \Delta v} \right) \cdot f_b = k \cdot f_b \tag{14}$$

I claim:

1. An optical fiber sensor, comprising:

a target for reflecting laser beams, having a first portion which is displaced by a measured pressure and a second portion which is not displaced by the measured pressure;

a laser beam generation means for generating a laser beam;

an optical coupler for dividing said laser beam;

a first optical fiber for directing a laser beam to the first portion of said target;

a second optical fiber for directing a laser beam to the second portion of said target;

a body formed unitarily with said target and having the same coefficient of thermal expansion as said target, for supporting a tip portion of said first optical fiber and a tip portion of said second optical fiber;

a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said target to be incident upon the end surface of said first optical fiber;

a first measurement circuit for detecting, from said interference beam divided by said first optical coupler, an interference condition between said first reflected laser beam and said second reflected laser beam, in order to measure a distance between the end surface of said first optical fiber and said first portion of said target;

a second optical coupler for directing another laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said target to be incident upon the end surface of said second optical fiber;

a second measurement circuit for detecting, from said interference beam divided by said second optical coupler, an interference condition between said first reflected laser beam and said second reflected laser beam, in order to measure a distance between the end surface of said second optical fiber and said second portion of said target; and a processing circuit for determining a difference between measurement results of said first measurement circuit and said second measurement circuit.

2. An optical fiber sensor according to claim 1, further comprising:

memory means wherein temperature change data determined from changes in distance between said end surface of the said second optical fiber and said second portion of said target measured by said second measurement circuit are pre-stored as correction coefficients for each temperature; and temperature compensation means for reading out a correction coefficient from said memory means based on temperature data determined from a distance between said end surface of said second optical fiber and said second portion of said target measured by said second measurement circuit, and determining a temperature-compensated difference value by applying said correction coefficient to the difference in measurement results between said first measurement circuit and said second measurement circuit determined by said processing circuit.

3. An optical fiber sensor according to claim 1, wherein end portions of gradient refractive index optical fibers are coupled to the end portions of said first optical fiber and said second optical fiber.

4. An optical fiber-sensor, comprising:

a target for reflecting laser beams, having a first portion which is displaced by a measured pressure and a second portion which is not displaced by the measured pressure;

a laser beam generation means for generating a laser beam;

an optical coupler for dividing said laser beam;

a laser drive means for applying a frequency modulation to said laser beam;

a first optical fiber for directing a laser beam to the first portion of said target;

a second optical fiber for directing a laser beam to the second portion of said target;

a body formed unitarily with said target and having the same coefficient of thermal expansion as said target, for supporting a tip portion of said first optical fiber and a tip portion of said second optical fiber;

a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said target to be incident upon the end surface of said first optical fiber;

a first measurement circuit for detecting, from said interference beam divided by said first optical coupler, a beat frequency between said first reflected laser beam and said second reflected laser beam, in order to measure a distance between the end surface of said first optical fiber and said first portion of said target;

a second optical coupler for directing another laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said target to be incident upon the end surface of said second optical fiber;

a second measurement circuit for detecting, from said interference beam divided by said second optical coupler, a beat frequency between said first reflected laser beam and said second reflected laser beam, in order to measure a distance between the end surface of said second optical fiber and said second portion of said target; and a processing circuit for determining a difference between measurement results of said first measurement circuit and said second measurement circuit.

5. An optical fiber sensor according to claim 4, further comprising:

memory means wherein temperature change data determined from changes in distance between said end surface of the said second optical fiber and said second portion of said target measured by said second measurement circuit are pre-stored as correction coefficients for each temperature; and temperature compensation means for reading out a correction coefficient from said memory means based on temperature data determined from a distance between said end surface of said second optical fiber and said second portion of said target measured by said second measurement circuit, and determining a temperature-compensated difference value by applying said correction coefficient to the difference in measurement results between said first measurement circuit and said second measurement circuit determined by said processing circuit.

6. An optical fiber sensor, comprising:

a plurality of first targets for reflecting laser beams, each having a first portion which is displaced by a measured pressure and a second portion which is not displaced by the measured pressure;

a plurality of second targets for reflecting laser beams, each having a first portion which is displaced by a measured pressure and a second portion which is not displaced by the measured pressure;

a laser beam generation means for generating a laser beam;

an optical coupler for dividing said laser beam;

a plurality of first optical fibers for directing laser beams respectively to the first portions of said first targets and the first portions of said second targets;

a plurality of second optical fibers for directing laser beams respectively to the second portions of said first targets;

a plurality of first bodies formed respectively unitarily with said plurality of first targets and respectively having the same coefficients of thermal expansion as said plurality of first targets, for respectively supporting tip portions of said plurality of first optical fibers corresponding to said plurality of first targets and tip portions of said plurality of second optical fibers;

a plurality of second bodies formed respectively unitarily with said plurality of second targets and respectively having the same coefficients of thermal expansion as said plurality of second targets, for respectively supporting tip portions of said plurality of first optical fibers corresponding to said plurality of second targets;

a plurality of first optical couplers for directing respective laser beams divided from said optical coupler to said first optical fibers, and dividing each interference beam respectively formed from a first reflected laser beam which has been reflected by a respective end surface of said plurality of first optical fibers and a second reflected laser beam which has been emitted from a respective end surface of said plurality of first optical fibers and respectively reflected by said first portions of said plurality of first and second targets to be incident upon respective end surfaces of said plurality of first optical fibers;

at least one first measurement circuit for detecting, from said interference beams respectively divided by said first optical coupler, interference conditions between said first reflected laser beams and said second reflected laser beams, in order to measure respective distances between the end surfaces of said plurality of first optical fibers and said first portions of said plurality of first and second targets;

a plurality of second optical couplers for directing respective laser beams divided from said optical coupler to said second optical fibers, and dividing each interference beam respectively formed from a first reflected laser beam which has been reflected by a respective end surface of said plurality of second optical fibers and a second reflected laser beam which has been emitted from a respective end surface of said plurality of second optical fibers and respectively reflected by said second portions of said plurality of first targets to be incident upon respective end surfaces of said plurality of second optical fibers;

at least one second measurement circuit for detecting, from said interference beams respectively divided by said second optical coupler, interference conditions between said first reflected laser beams and said second reflected laser beams, in order to measure distances between the end surfaces of at least one of said plurality of second optical fibers and the second portions of corresponding first targets; and at least one processing circuit for determining a difference between measurement results of said first measurement circuit and said second measurement circuit.

7. An optical fiber sensor according to claim 6, further comprising:

memory means wherein temperature change data determined from changes in distance between said end surfaces of the said second optical fibers and said second portions of said targets measured by said second measurement circuit are pre-stored as correction coefficients for each temperature; and temperature compensation means for reading out a correction coefficient from said memory means based on temperature data determined from the distances between said end surfaces of said second optical fibers and said second portions of said targets measured by said second measurement circuit, and determining a temperature-compensated difference value by applying said correction coefficient to the difference in measurement results between said first measurement circuit and said second measurement circuit determined by said processing circuit.

8. An optical fiber sensor, comprising:

a first target for reflecting laser beams, having a first portion which is displaced by a measured pressure and a second portion which is not displaced by the measured pressure;

a second target for reflecting laser beams;

laser beam generation means for generating a laser beam;

an optical coupler for dividing said laser beam;

laser drive means for applying a frequency modulation to said laser beam;

a first optical fiber for directing a laser beam to the first portion of said first target;

a second optical fiber for directing a laser beam to the second portion of said first target;

a third optical fiber for directing a laser beam to the surface of said second target;

a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said first target to be incident upon the end surface of said first optical fiber;

a first measurement circuit for detecting, from said interference beam divided by said first optical coupler, a beat frequency between said first reflected laser beam and said second reflected laser beam, in order to measure a distance between the end surface of said first optical fiber and said first portion of said first target;

a second optical coupler for directing a laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said first target to be incident upon the end surface of said second optical fiber;

a second measurement circuit for detecting, from said interference beam divided by said second optical coupler, a beat frequency between said first reflected laser beam and said second reflected laser beam, in order to measure a distance between the end surface of said second optical fiber and said second portion of said first target;

a third optical coupler for directing a laser beam divided from said optical coupler to said third optical fiber, and dividing an interference beam formed from a first reflected laser beam which has been reflected by an end surface of said third optical fiber and a second reflected laser beam which has been emitted from the end surface of said third optical fiber and reflected by the surface of said second target to be incident upon the end surface of said third optical fiber;

a third measurement circuit for detecting, from said interference beam divided by said third optical coupler, a beat frequency between said first reflected laser beam and said second reflected laser beam;

control means for controlling said laser beam drive means such that the beat frequency detected by said third measurement circuit is held constant; and a processing circuit for determining a difference between measurement results of said first measurement circuit and said second measurement circuit.

9. An optical fiber sensor according to claim 8, wherein the end portion of said third optical fiber and said second target are provided within a vacuum structure so that an optical path length between the end portion of said third optical fiber and the surface of said second target is not influenced by refractive index changes due to atmospheric fluctuations.

10. An optical fiber sensor according to claim 8, wherein the end portion of said third optical fiber and said second target are provided within a thermostatic apparatus which is held at a constant temperature so that an optical path length between the end portion of said third optical fiber and the surface of said second target is only minutely influenced by refractive index changes due to atmospheric fluctuations.

11. An optical fiber sensor, comprising:

a first target for reflecting laser beams, having a first portion which is displaced by a measured pressure and a second portion which is not displaced by the measured pressure;

a second target for reflecting laser beams;

laser beam generation means for generating a laser beam;

an optical coupler for dividing said laser beam;

laser drive means for applying a frequency modulation to said laser beam;

a first optical fiber for directing a laser beam to the first portion of said first target;

a second optical fiber for directing a laser beam to the second portion of said first target;

a third optical fiber for directing a laser beam to the surface of said second target;

a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said first target to be incident upon the end surface of said first optical fiber;

a first measurement circuit for detecting, from said interference beam divided by said first optical coupler, a beat frequency between said first reflected laser beam and said second reflected laser beam, in order to measure a distance between the end surface of said first optical fiber and said first portion of said first target;

a second optical coupler for directing a laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said first target to be incident upon the end surface of said second optical fiber;

a second measurement circuit for detecting, from said interference beam divided by said second optical coupler, a beat frequency between said first reflected laser beam and said second reflected laser beam, in order to measure a distance between the end surface of said second optical fiber and said second portion of said first target;

a third optical coupler for directing a laser beam divided from said optical coupler to said third optical fiber, and dividing an interference beam formed from a first reflected laser beam which has been reflected by an end surface of said third optical fiber and a second reflected laser beam which has been emitted from the end surface of said third optical fiber and reflected by the surface of said second target to be incident upon the end surface of said third optical fiber;

a third measurement circuit for detecting, from said interference beam divided by said third optical coupler, a beat frequency between said first reflected laser beam and said second reflected laser beam; and a correction processing circuit for performing correction calculations of the difference in measurement results between said first measurement circuit and said second measurement circuit based on data relating to said beat frequency detected by said third measurement circuit.

12. An optical fiber sensor according to claim 11, wherein the end portion of said third optical fiber and said second target are provided within a vacuum structure so that an optical path length between the end portion of said third optical fiber and the surface of said second target is not influenced by refractive index changes due to atmospheric fluctuations.

13. An optical fiber sensor according to claim 11, wherein the end portion of said third optical fiber and said second target are provided within a thermostatic apparatus which is held at a constant temperature so that an optical path length between the end portion of said third optical fiber and the surface of said second target is only minutely influenced by refractive index changes due to atmospheric fluctuations.

14. An optical fiber sensor, comprising:

a first target for reflecting laser beams, having a first portion which is displaced by a measured pressure and a second portion which is not displaced by the measured pressure;

a second target for reflecting laser beams;

laser beam generation means for generating a laser beam;

an optical coupler for dividing said laser beam;

laser drive means for applying a frequency modulation to said laser beam;

a first optical fiber for directing a laser beam to the first portion of said first target;

a second optical fiber for directing a laser beam to the second portion of said first target;

a third optical fiber for directing a laser beam to the surface of said second target;

a first optical coupler for directing a laser beam divided from said optical coupler to said first optical fiber, and dividing an interference beam formed from a first reflected laser beam which has been reflected by an end surface of said first optical fiber and a second reflected laser beam which has been emitted from the end surface of said first optical fiber and reflected by said first portion of said first target to be incident upon the end surface of said first optical fiber;

a first measurement circuit for detecting, from said interference beam divided by said first optical coupler, a beat frequency between said first reflected laser beam and said second reflected laser beam, in order to measure a distance between the end surface of said first optical fiber and said first portion of said first target;

a second optical coupler for directing a laser beam divided from said optical coupler to said second optical fiber, and dividing an interference beam formed from a first reflected laser beam which has been reflected by an end surface of said second optical fiber and a second reflected laser beam which has been emitted from the end surface of said second optical fiber and reflected by said second portion of said first target to be incident upon the end surface of said second optical fiber;

a second measurement circuit for detecting, from said interference beam divided by said second optical coupler, a beat frequency between said first reflected laser beam and said second reflected laser beam, in order to measure a distance between the end surface of said second optical fiber and said second portion of said first target;

a third optical coupler for directing a laser beam divided from said optical coupler to said third optical fiber, and dividing an interference beam formed from a first reflected laser beam which has been reflected by an end surface of said third optical fiber and a second reflected laser beam which has been emitted from the end surface of said third optical fiber and reflected by the surface of said second target to be incident upon the end surface of said third optical fiber;

a third measurement circuit for detecting, from said interference beam divided by said third optical coupler, a beat frequency between said first reflected laser beam and said second reflected laser beam; and a correction processing circuit for performing correction calculations of the measurement results of said first measurement circuit based on data relating to said beat frequency detected by said third measurement circuit.

15. An optical fiber sensor according to claim 14, wherein the end portion of said third optical fiber and said second target are provided within a vacuum structure so that an optical path length between the end portion of said third optical fiber and the surface of said second target is not influenced by refractive index changes due to atmospheric fluctuations.

16. An optical fiber sensor according to claim 14, wherein the end portion of said third optical fiber and said second target are provided within a thermostatic apparatus which is held at a constant temperature so that an optical path length between the end portion of said third optical fiber and the surface of said second target is only minutely influenced by refractive index changes due to atmospheric fluctuations.

* * * * *